US012164905B2

(12) United States Patent
Krishnan et al.

(10) Patent No.: US 12,164,905 B2
(45) Date of Patent: Dec. 10, 2024

(54) SOFTWARE UPGRADE DEPLOYMENT IN MIXED NETWORK OF IN-SERVICE SOFTWARE UPGRADE (ISSU)-CAPABLE AND ISSU-INCAPABLE DEVICES

(71) Applicant: Juniper Networks, Inc., Sunnyvale, CA (US)

(72) Inventors: Manish Krishnan, Sunnyvale, CA (US); Tong Jiang, Fremont, CA (US); Vivekananda Shenoy, Singapore (SG); Soumil Ramesh Kulkarni, San Jose, CA (US); Vinod Nair, San Jose, CA (US); Jeba Paulaiyan, San Jose, CA (US)

(73) Assignee: JUNIPER NETWORKS, INC., Sunnyvale, CA (US)

( * ) Notice: Subject to any disclaimer, the term of this patent is extended or adjusted under 35 U.S.C. 154(b) by 328 days.

(21) Appl. No.: 16/368,381

(22) Filed: Mar. 28, 2019

(65) Prior Publication Data
US 2020/0310784 A1    Oct. 1, 2020

(51) Int. Cl.
*H04L 41/082* (2022.01)
*G06F 8/656* (2018.01)
(Continued)

(52) U.S. Cl.
CPC ............ *G06F 8/656* (2018.02); *H04L 41/082* (2013.01); *H04L 41/0853* (2013.01);
(Continued)

(58) Field of Classification Search
CPC ..... H04L 67/34; H04L 41/082; H04L 45/127; H04L 41/0836; H04L 41/0853;
(Continued)

(56) References Cited

U.S. PATENT DOCUMENTS 6,678,781 B1   1/2004 Domon
6,760,328 B1   7/2004 Ofek
(Continued)

FOREIGN PATENT DOCUMENTS

CN   101651703 A   2/2010
CN   104521196 A   4/2015
(Continued)

OTHER PUBLICATIONS

Mohapatra et al., "BGP Prefix Origin Validation State Extended Community," RFC 8097, Internet Engineering Task Force (IETF), Mar. 2017, 6 pp.
(Continued)

*Primary Examiner* — Le H Luu
(74) *Attorney, Agent, or Firm* — Shumaker & Sieffert, P.A.

(57) ABSTRACT

Techniques are disclosed for deploying software upgrades to a mixed network of In-Service Software Upgrade (ISSU)-capable and ISSU-incapable network devices without interrupting network traffic serviced by the mixed network. In one example, a centralized controller for a network determines that first network devices of a plurality of network devices for the network are In-Service Software Upgrade (ISSU)-capable and second network devices of the plurality of network devices are not ISSU-capable. The centralized controller transmits messages instructing the first network devices to perform an ISSU operation. Further, the centralized controller transmits messages instructing each network device of the second network devices to transmit a message to peer network devices of the network device, the message indicating that the network device is not ISSU-capable. In response to receiving the message indicating that the network device is not ISSU-capable, the peer network devices redirect traffic to avoid the network device.

19 Claims, 6 Drawing Sheets

(51) Int. Cl.
*H04L 41/08* (2022.01)
*H04L 41/0853* (2022.01)
*H04L 41/0869* (2022.01)
*H04L 45/02* (2022.01)
*H04L 45/12* (2022.01)
*H04L 45/64* (2022.01)
*H04L 69/164* (2022.01)

(52) U.S. Cl.
CPC ...... *H04L 41/0869* (2013.01); *H04L 41/0889* (2013.01); *H04L 45/026* (2013.01); *H04L 45/127* (2013.01); *H04L 45/64* (2013.01); *H04L 69/164* (2013.01)

(58) Field of Classification Search
CPC ............ H04L 41/0869; H04L 41/0889; H04L 41/0895; H04L 41/342; H04L 45/026; H04L 45/563; H04L 45/64; H04L 69/164; G06F 2201/81; G06F 8/65; G06F 8/656; H04M 1/72525
See application file for complete search history.

(56) References Cited

U.S. PATENT DOCUMENTS

| | | |
|---|---|---|
| 7,042,838 B1 | 5/2006 | Shand et al. |
| 7,176,662 B2 | 2/2007 | Chandrasekaran |
| 7,184,437 B1 | 2/2007 | Cole et al. |
| 7,519,006 B1 | 4/2009 | Wing |
| 7,599,349 B2 | 10/2009 | Vasseur et al. |
| 7,716,662 B2 | 5/2010 | Seiden |
| 7,937,492 B1 | 5/2011 | Kompella et al. |
| 7,978,708 B2 | 7/2011 | Filsfils et al. |
| 8,179,801 B2 | 5/2012 | Previdi et al. |
| 8,300,532 B1 | 10/2012 | Venkatramani et al. |
| 8,339,959 B1 | 12/2012 | Moisand et al. |
| 8,423,666 B2 | 4/2013 | Garcia-Luna-Aceves et al. |
| 8,472,205 B2 | 6/2013 | Gondosch et al. |
| 8,606,847 B2 | 12/2013 | Raghunath et al. |
| 8,688,775 B2 | 4/2014 | Penno et al. |
| 8,693,374 B1 | 4/2014 | Murphy et al. |
| 8,700,801 B2 | 4/2014 | Medved et al. |
| 8,750,288 B2 | 6/2014 | Nakil et al. |
| 8,751,613 B1 | 6/2014 | Medved et al. |
| 8,782,631 B2 | 7/2014 | Volkmer et al. |
| 8,782,632 B1 | 7/2014 | Chigurapati et al. |
| 8,885,463 B1 | 11/2014 | Medved et al. |
| 8,897,134 B2* | 11/2014 | Kern ............... H04L 45/02 |
| | | 370/235 |
| 8,943,490 B1* | 1/2015 | Jain .............. H04Q 3/54516 |
| | | 717/168 |
| 8,954,491 B1 | 2/2015 | Medved et al. |
| 8,959,139 B2 | 2/2015 | Medved et al. |
| 8,995,285 B2 | 3/2015 | Bajpay et al. |
| 9,019,865 B2 | 4/2015 | Gredler et al. |
| 9,325,788 B2 | 4/2016 | Wang et al. |
| 9,356,866 B1 | 5/2016 | Sivaramakrishnan et al. |
| 9,413,847 B2 | 8/2016 | Medved et al. |
| 9,641,435 B1 | 5/2017 | Sivaramakrishnan |
| 9,667,550 B2 | 5/2017 | Gredler et al. |
| 9,674,108 B1* | 6/2017 | Ryan et al. |
| 9,715,380 B2* | 7/2017 | Ramachandran ....... H04L 67/34 |
| 9,792,106 B1* | 10/2017 | Kommula ................ G06F 8/65 |
| 10,083,026 B1 | 9/2018 | Venkata et al. |
| 10,135,683 B1 | 11/2018 | Medved et al. |
| 10,200,274 B1* | 2/2019 | Suryanarayana ....... H04L 49/70 |
| 10,355,929 B2* | 7/2019 | Johnston ............... H04L 43/065 |
| 2002/0062310 A1 | 5/2002 | Marmor et al. |
| 2002/0128768 A1 | 9/2002 | Nakano et al. |
| 2003/0179742 A1 | 9/2003 | Ogier et al. |
| 2003/0189919 A1 | 10/2003 | Gupta et al. |
| 2004/0243503 A1 | 12/2004 | Eng et al. |
| 2005/0068968 A1 | 3/2005 | Ovadia et al. |
| 2005/0135231 A1* | 6/2005 | Bellovin ............... H04L 45/28 |
| | | 370/216 |
| 2005/0170845 A1 | 8/2005 | Moran |
| 2006/0007944 A1* | 1/2006 | Movassaghi ........ H04L 41/0813 |
| | | 370/401 |
| 2006/0029033 A1 | 2/2006 | Lee |
| 2006/0029035 A1* | 2/2006 | Chase ..................... H04L 45/02 |
| | | 370/351 |
| 2006/0039391 A1 | 2/2006 | Vasseur et al. |
| 2006/0085829 A1 | 4/2006 | Dhodapkar et al. |
| 2006/0133265 A1 | 6/2006 | Lee |
| 2006/0153200 A1 | 7/2006 | Filsfils et al. |
| 2006/0193248 A1 | 8/2006 | Filsfils et al. |
| 2006/0200579 A1 | 9/2006 | Vasseur et al. |
| 2006/0291445 A1 | 12/2006 | Martini et al. |
| 2006/0291446 A1 | 12/2006 | Caldwell et al. |
| 2007/0050497 A1 | 3/2007 | Haley et al. |
| 2007/0064702 A1 | 3/2007 | Bates et al. |
| 2007/0195797 A1 | 8/2007 | Patel et al. |
| 2007/0260746 A1 | 11/2007 | Mirtorabi et al. |
| 2007/0280102 A1 | 12/2007 | Vasseur et al. |
| 2008/0062891 A1 | 3/2008 | Van der Merwe et al. |
| 2009/0016365 A1 | 1/2009 | Sajassi et al. |
| 2009/0122718 A1 | 5/2009 | Klessig et al. |
| 2009/0122724 A1 | 5/2009 | Rosenberg |
| 2009/0234715 A1 | 9/2009 | Heiser et al. |
| 2010/0061242 A1 | 3/2010 | Sindhu et al. |
| 2010/0150155 A1* | 6/2010 | Napierala ............... H04L 45/00 |
| | | 370/390 |
| 2010/0161755 A1 | 6/2010 | Li et al. |
| 2010/0208741 A1 | 8/2010 | Vasseur |
| 2010/0214932 A1 | 8/2010 | Qian et al. |
| 2010/0235083 A1 | 9/2010 | Takahata et al. |
| 2010/0278076 A1 | 11/2010 | Reddy et al. |
| 2010/0293294 A1 | 11/2010 | Hilt et al. |
| 2010/0309841 A1 | 12/2010 | Conte et al. |
| 2011/0078230 A1 | 3/2011 | Sepulveda |
| 2011/0134769 A1 | 6/2011 | Lee et al. |
| 2011/0138469 A1 | 6/2011 | Ye et al. |
| 2011/0202651 A1 | 8/2011 | Hilt et al. |
| 2011/0258257 A1 | 10/2011 | Previdi |
| 2011/0276718 A1 | 11/2011 | Steiner et al. |
| 2011/0295983 A1 | 12/2011 | Medved et al. |
| 2011/0296044 A1* | 12/2011 | Weis ................... H04L 43/0811 |
| | | 709/230 |
| 2011/0296053 A1 | 12/2011 | Medved et al. |
| 2012/0058757 A1 | 3/2012 | Cancer Abreu et al. |
| 2012/0066368 A1 | 3/2012 | Li et al. |
| 2012/0072894 A1* | 3/2012 | Wang ....................... G06F 8/65 |
| | | 717/168 |
| 2012/0102223 A1 | 4/2012 | Zhang et al. |
| 2012/0144066 A1 | 6/2012 | Medved et al. |
| 2012/0317293 A1 | 12/2012 | Gu et al. |
| 2013/0329548 A1 | 12/2013 | Nakil et al. |
| 2014/0050077 A1* | 2/2014 | Kasat ....................... H04L 69/40 |
| | | 370/216 |
| 2014/0101254 A1 | 4/2014 | Raghunath et al. |
| 2014/0105068 A1* | 4/2014 | Xu ........................ H04L 45/563 |
| | | 370/255 |
| 2014/0215051 A1 | 7/2014 | Schlack et al. |
| 2014/0215079 A1 | 7/2014 | Penno et al. |
| 2014/0229581 A1 | 8/2014 | Medved et al. |
| 2014/0241247 A1 | 8/2014 | Kempf et al. |
| 2014/0304414 A1 | 10/2014 | Yengalasetti et al. |
| 2014/0304698 A1* | 10/2014 | Chigurapati ............ G06F 8/656 |
| | | 717/171 |
| 2015/0003283 A1 | 1/2015 | Previdi et al. |
| 2015/0029849 A1 | 1/2015 | Frost et al. |
| 2015/0092551 A1 | 4/2015 | Moisand et al. |
| 2015/0124644 A1* | 5/2015 | Pani ..................... H04L 41/082 |
| | | 370/254 |
| 2015/0146536 A1 | 5/2015 | Minei et al. |
| 2015/0149812 A1 | 5/2015 | Arisoylu et al. |
| 2015/0180762 A1 | 6/2015 | Medved et al. |
| 2015/0186206 A1* | 7/2015 | Bhattacharya ...... G06F 11/0793 |
| | | 714/3 |
| 2015/0220327 A1* | 8/2015 | Poon ........................ G06F 16/21 |
| | | 717/120 |
| 2015/0244628 A1 | 8/2015 | Gredler et al. |

(56) References Cited

U.S. PATENT DOCUMENTS

| | | | |
|---|---|---|---|
| 2015/0263867 A1* | 9/2015 | Chen | H04L 12/6418 |
| | | | 370/401 |
| 2016/0139939 A1 | 5/2016 | Bosch et al. | |
| 2016/0182351 A1 | 6/2016 | Wang et al. | |
| 2016/0191306 A1 | 6/2016 | Gasparakis et al. | |
| 2016/0342510 A1* | 11/2016 | Pani | G06F 12/0615 |
| 2016/0350095 A1* | 12/2016 | Ramachandran | H04L 41/0213 |
| 2016/0352629 A1 | 12/2016 | Wang et al. | |
| 2016/0352631 A1 | 12/2016 | Medved et al. | |
| 2016/0364231 A1* | 12/2016 | Tati | G06F 8/656 |
| 2017/0086115 A1 | 3/2017 | Chung et al. | |
| 2017/0093616 A1* | 3/2017 | Yan | H04L 41/082 |
| 2017/0141968 A1* | 5/2017 | Lloyd | H04L 41/0886 |
| 2017/0366452 A1 | 12/2017 | Moisand et al. | |
| 2018/0006935 A1 | 1/2018 | Mutnuru et al. | |
| 2019/0158541 A1 | 5/2019 | Miriyala et al. | |
| 2019/0173901 A1* | 6/2019 | Mi | H04L 63/1441 |

FOREIGN PATENT DOCUMENTS

| | | |
|---|---|---|
| CN | 108551405 A | 9/2018 |
| CN | 109428821 A | 3/2019 |
| EP | 2461547 A1 | 6/2012 |
| EP | 2854347 A2 | 4/2015 |
| WO | 2011054913 A1 | 5/2011 |
| WO | 2012038884 A1 | 3/2012 |
| WO | 2013/184846 A1 | 12/2013 |
| WO | 2016062355 A1 | 4/2016 |

OTHER PUBLICATIONS

Banks et al., "ISSU Benchmarking Methodology," draft-ietf-bmwg-issu-meth-02, Benchmarking Working Group, Internet Draft, Aug. 8, 2015, 17 pp.

Extended Search Report from counterpart European Application No. 19181483.9, dated Jan. 27, 2020, 13 pp.

"ETSI GS NFV-MAN 001 V1.1.1—Network Functions Virtualisation (NFV); Management and Orchestration," European Telecommunications Standards Institute, ETSI GS NFV-MAN 001 v1.1.1, Dec. 2014, 184 pp.

"Contrail Architecture," White Paper, Juniper Networks, Inc., Sep. 2015, 44 pp.

"Enabling Solutions in Cloud Infrastructure and for Network Functions Virtualization," White Paper, Juniper Networks, Inc., Feb. 2015, 16 pp.

Fernando et al., "Service Chaining using Virtual Networks with BGP VPNs, draft-ietf-bess-service-chaining-00," Internet-Draft, BGP Enabled Services (bess), Apr. 13, 2016, 41 pp.

Rekhter, "IPv6 Address Specific BGP Extended Community Attribute," RFC 5701, Network Working Group, Nov. 2009, 5 pp.

Scudder et al., "Capabilities Advertisement with BGP-4," RFC 5492, Network Working Group, Feb. 2009, 7 pp.

Sangli,"BGP Extended Communities Attribute," RFC 4360, Network Working Group, Feb. 2006, 12 pp.

Rosen et al., "IANA Registries for BGP Extended Communities," RFC 7153, Internet Engineering Task Force (IETF), Mar. 2014, 16 pp.

Alimi et al., "ALTO Protocol, draft-ietf-alto-protocol-03.txt," ALTO WG Internet-Draft, Mar. 8, 2010, 53 pp.

Alimi et al., "ALTO Protocol, draft-ietf-alto-protocol-06.txt," ALTO WG Internet-Draft, Oct. 25, 2010, 66 pp.

Bates et al., "Multiprotocol Extensions for BGP-4," RFC 4760, Network Working Group, Jan. 2007,13 pp.

Chandra et al., "BGP Communities Attribute", RFC 1997, Network Working Group, Aug. 1996, 6 pp.

Gredler et al., "Advertising Traffic Engineering Information in BGP", draft-gredler-bgp-te-00, Inter-Domain Routing, Internet Draft, published Mar. 4, 2011, 18 pp.

Harrison et al., "IPv6 Traffic Engineering in IS-IS," RFC 6119, Internet Engineering Task Force (IETF), Feb. 2011, 10 pp.

Katz et al., "Traffic Engineering (TE) Extensions to OSPF Version 2," RFC 3630, Network Working Group, Sep. 2003, 15 pp.

Kompella et al., "IS-IS Extensions in Support of Generalized Multi-Protocol Label Switching (GMPLS)," RFC 5307, Network Working Group, Oct. 2008, 13 pp.

Kompella et al., "Routing Extensions in Support of Generalized Multi-Protocol Label Switching (GMPLS)," RFC 4202, Network Working Group, Oct. 2005, 27 pp.

Li, et al., "IS-IS Extensions for Traffic Engineering," RFC 5305, Network Working Group, Oct. 2008, 15 pp.

Penno et al., "ALTO and Content Delivery Networks, draft-penno-alto-cdn-00," Internet-Draft, Network Working Group, Internet Draft, Jun. 4, 2010, 19 pp.

Penno et al., "ALTO Protocol, draft-penno-alto-protocol-00.txt," Internet Draft, ALTO WG, Mar. 4, 2009, 22 pp.

Penno et al., "ALTO and Content Delivery Networks, draft-penno-alto-cdn-03," Internet-Draft, Network Working Group, Mar. 14, 2011, 28 pp.

Seedorf, et al, "Traffic Localization for P2P-Applications: The ALTO Approach," IEEE P2P'09, Sep. 9-11, 2009, pp. 171-177.

Seedorf et al., "Application-Layer Traffic Optimization (ALTO) Problem Statement," RFC 5693, Network Working Group, Oct. 2009, 14 pp.

Sheng et al., "Application Layer Traffic Optimization in the eMule System," 2010 Fifth International Conference on Internet and Web Applications and Services, May 9-15, 2010, pp. 217-222.

Ye, et al., "A Scheme to Solve P2P Alto Problem," 2010 Second International Workshop on Education Technology and Computer Science, Mar. 6-7, 2010, pp. 459-462.

Zimmerman, "OSI Reference Model—The ISO Model for Architecture for Open Systems Interconnection," IEEE Transactions on Communications, vol. 28, No. 4, Apr. 1980, pp. 425-432.

Rekhter et al., "A Border Gateway Protocol 4 (BGP-4)", RFC 4271, Network Working Group, Jan. 2006, 93 pp.

Vohra et al., "BGP Support for Four-octet AS Number Space," RFC 4893, Network Working Group, May 2007, 11 pp.

Hopps, "Analysis of an Equal-Cost Multi-Path Algorithm," RFC 2992, Network Working Group, Nov. 2000, 8 pp.

"TCG Trusted Network Connection—TNC IF-MAP Binding for SOAP—Specification Version 2.1, Revision 15," Trusted Computing Group, May 7, 2012, 81 pp.

Venkata, "OpenContrail In Service Software Upgrade," GitHub, OpenContrail Blog, Jun. 16, 2016, accessed from http://www.opencontrail.org/opencontrail-in-service-software-upgrade/, 7 pp.

Vanbever et al., "HotSwap: Correct and Efficient Controller Upgrades for Software-Defined Networks," HotSDN'13, ACM, Aug. 16, 2013, 6 pp.

"IEEE Standard for Local and metropolitan area networks—802.1ag Virtual Brdiged Local Area Networks. Amendment 5: Connectivity Fault Management," IEEE Computer Society, LAN/MAN Standards Committee, Dec. 17, 2007, 260 pp.

Sajassi et al., "BGP MPLS-Based Ethernet VPN," RFC 7432, Internet Engineering Task Force (IETF), Feb. 2015, 56 pp.

Knoll, "A Concept of Inter-AS Priority Signaling using BGP Attributes" Networks 2008 International Telecommunications Network Strategy and Planning Symposium, Sep. 28-Oct. 2, 2008, 14 pp.

Rekhter et al., "Address Allocation for Private Internets," RFC 1918, Network Working Group, Feb. 1996, 9 pp.

Farrel et al., "A Path Computation Element (PCE)—Based Architecture," RFC 4655, Network Working Group, Aug. 2006, 40 pp.

Bradner, "Key words for use in RFCs to Indicate Requirement Levels," RFC 2119, Network Working Group, Mar. 1997, 3 pp.

Narten et al., "Guidelines for Writing an IANA Considerations Section in RFCs," RFC 5226, Network Working Group, May 2008, 27 pp.

Yong et al., "Transparent Interconnection of Lots of Links (TRILL) Transport Using Pseudowires," RFC 7173, Internet Engineering Task Force (IETF), May 2014, 11 pp.

U.S. Appl. No. 15/639,556, by Juniper Networks, Inc. (Inventors: Venkata et al.), filed Jun. 30, 2017.

U.S. Appl. No. 15/823,906, by Juniper Networks, Inc. (Inventors: Mutnuru et al.), filed Nov. 28, 2017.

(56) References Cited

OTHER PUBLICATIONS

U.S. Appl. No. 16/145,682, by Juniper Networks, Inc. (Inventors: Miriyala et al.), filed Sep. 28, 2018.
"IS-IS TLV Codepoints," retrieved from https://web.archive.org/web/20190327074507/http://www.iana.org/assignments/isis-tlv-codepoints/isis-tlv-codepoints xhtml, archived on Mar. 27, 2019, 12 pp.
Response to Extended Search Report from counterpart European Application No. 19181483.9, filed Mar. 29, 2021, 34 pp.
Communication pursuant to Article 94(3) EPC from counterpart European Application No. 19181483.9 dated Aug. 2, 2023, 3 pp.
Communication pursuant to Article 94(3) EPC from counterpart European Application No. 19181483.9 dated Feb. 9, 2024, 3 pp.
Communication pursuant to Article 94(3) EPC from counterpart European Application No. 19181483.9 dated Mar. 16, 2023, 7 pp.
First Office Action and Search Report, and translation thereof, from counterpart Chinese Application No. 201910937189.X dated Sep. 7, 2022, 17 pp.
Notice of Intent to Grant from counterpart Chinese Application No. 201910937189.X dated Aug. 21, 2023, 3 pp.
Response to Communication pursuant to Article 94(3) EPC dated Aug. 2, 2023, from counterpart European Application No. 19181483.9 filed Dec. 1, 2023, 9 pp.
Response to Communication pursuant to Article 94(3) EPC dated Feb. 9, 2024, from counterpart European Application No. 19181483.9 filed Jun. 4, 2024, 11 pp.
Response to Communication pursuant to Article 94(3) EPC dated Mar. 16, 2023, from counterpart European Application No. 19181483.9 filed Jul. 14, 2023, 20 pp.
Second Office Action from counterpart Chinese Application No. 201910937189.X dated May 31, 2023, 8 pp.
Zhang et al., "Design of ISSU System for Devices in Distributed Network", vol. 19, No. 6, Jun. 15, 2010, pp. 40-43, Translation Unavailable, URL: http://www.c-s-a.org.cn/csa/article/pdf/20100611.
Notice of Intent to Grant and Text Intended to Grant from counterpart European Application No. 19181483.9 dated Sep. 20, 2024, 40 pp.

* cited by examiner

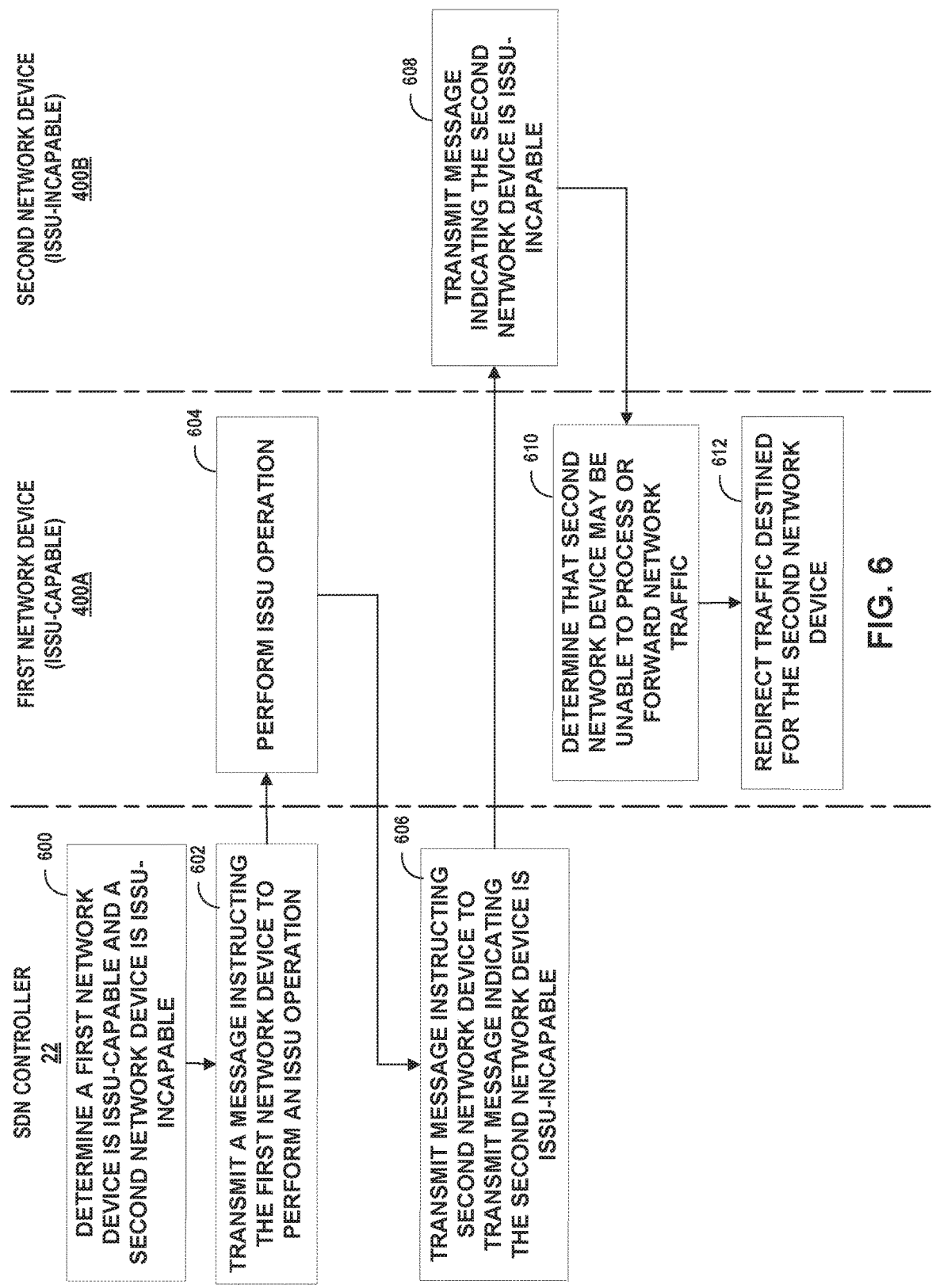

SOFTWARE UPGRADE DEPLOYMENT IN MIXED NETWORK OF IN-SERVICE SOFTWARE UPGRADE (ISSU)-CAPABLE AND ISSU-INCAPABLE DEVICES

TECHNICAL FIELD

This disclosure generally relates to the software maintenance of cloud data centers and networks.

BACKGROUND

In a typical cloud data center environment, there is a large collection of interconnected servers that provide computing (e.g., compute nodes) and/or storage capacity to run various applications. For example, a data center comprises a facility that hosts applications and services for subscribers, i.e., customers of data center. The data center for example, hosts all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Periodically, the physical network switches and routers of the high-speed switch fabric may need to be updated. For example, software installed and running on network devices within the data center may need to be either upgraded or replaced. Conventionally, installing the software update typically requires the network device to transition offline and stop execution or management of network traffic so that the software update may be performed. During this period, customer traffic flow and customer applications executing within the cloud data center may be interrupted or entirely unavailable.

SUMMARY

In general, the disclosure describes techniques for deploying software upgrades to a mixed network of In-Service Software Upgrade (ISSU)-capable and ISSU-incapable network devices without interrupting network traffic serviced by the mixed network. In one example, a centralized controller of a network, such as a Software-Defined Networking (SDN) controller or an administrator computing device, determines which network devices of the network are ISSU-capable and which network devices are ISSU-incapable. The centralized controller instructs the network devices that are ISSU-capable to perform an ISSU operation, e.g. to apply a software update. Further, the centralized controller prompts the network devices that are ISSU-incapable to transmit messages to peer network devices, such as the upgraded network devices. The messages indicate that the network devices are ISSU-incapable. The receiving network devices may process such messages to determine that the ISSU-incapable network devices may be unavailable to process or forward network traffic while performing the software upgrade. In response to determining that the ISSU-incapable devices may (or will) be unavailable, the peer network devices redirect traffic to avoid forwarding the traffic to the ISSU-incapable network devices so as to avoid interruption of network traffic across the network.

The techniques of the disclosure provide specific technical improvements to the field of software maintenance of computer networks, particularly cloud networks and data centers that include large numbers of network devices in complex arrangements. For example, the techniques of the disclosure enable deployment of software upgrades to a mixed network of ISSU-capable and ISSU-incapable network devices without interrupting network traffic serviced by the mixed network. While an administrator may still need to upgrade ISSU-incapable network devices manually, the administrator is able to take advantage of the ISSU capabilities of ISSU-capable network devices even in a mixed network of ISSU-capable and ISSU-incapable network devices, thereby substantially reducing the burden of deploying software upgrades to a mixed network. Furthermore, the techniques of the disclosure provide a mechanism for ISSU-incapable network devices to notify peer network devices that they are ISSU-incapable, thereby allowing the peer network devices to temporarily route traffic around the ISSU-incapable network devices while the ISSU-incapable network devices are unable to process or forward network traffic. Thus, the techniques of the disclosure allow ISSU-incapable network devices to avoid causing interruptions to customer traffic and customer applications serviced by the network while performing software upgrades.

In one example, this disclosure describes a method comprising: determining, by a centralized controller of a network, that first network devices of a plurality of network devices for the network are In-Service Software Upgrade (ISSU)-capable and second network devices of the plurality of network devices are not ISSU-capable; transmitting, by the centralized controller, one or more messages instructing the first network devices to perform an ISSU operation; and transmitting, by the centralized controller, one or more messages instructing each network device of the second network devices to transmit messages to peer network devices, the messages indicating that the network device of the second network devices is not ISSU-capable.

In another example, this disclosure describes a centralized controller of a network configured to: determine that first network devices of a plurality of network devices for the network are In-Service Software Upgrade (ISSU)-capable and second network devices of the plurality of network devices are not ISSU-capable; transmit messages instructing the first network devices to perform an ISSU operation; and transmit messages instructing each network device of the second network devices to transmit a message to peer network devices of the network device, the message indicating that the network device is not ISSU-capable.

In another example, this disclosure describes a first network device of a plurality of network devices of a network, the first network device configured to: receive, from a second network device, a message indicating that the second network device is not In-Service Software Upgrade (ISSU)-capable, wherein the second network device is a peer of the first network device; and in response to receiving the message indicating that the second network device is not ISSU-capable, redirecting traffic to avoid forwarding the traffic to the second network device.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 6 is a flowchart illustrating an example operation in accordance with the techniques of the disclosure.

Like reference characters refer to like elements throughout the figures and description.

DETAILED DESCRIPTION

Figure 1:
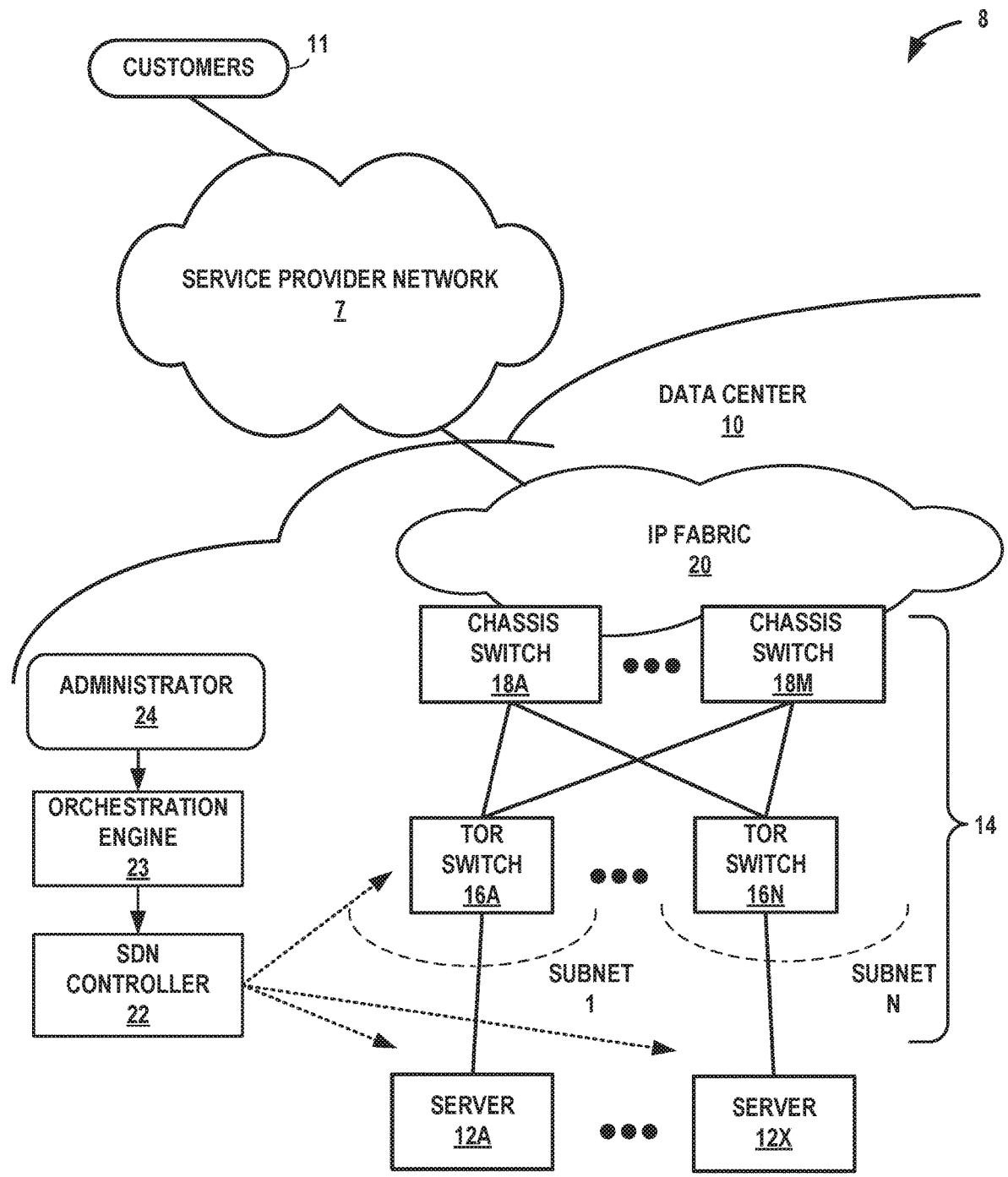
FIG. 1 is a block diagram illustrating an example network having a data center in which examples of the techniques described herein may be implemented.

FIG. 1 is a block diagram illustrating an example network system in which examples of the techniques described herein may be implemented. Network system 2 in the example of FIG. 1 includes data center 10 interconnected with customer networks associated with customers 11 via a service provider network 7. In general, data center 10 provides an operating environment for applications and services for customers 11 coupled to the data center by service provider network 7. Data center 10 may, for example, host infrastructure equipment, such as networking and storage systems, redundant power supplies, and environmental controls. Service provider network 7 may be coupled to one or more networks administered by other providers, and may thus form part of a large-scale public network infrastructure, e.g., the Internet.

In some examples, data center 10 may represent one of many geographically distributed network data centers. As illustrated in the example of FIG. 1, data center 10 may be a facility that provides network services for customers 11. Customers 11 may be collective categories such as enterprises and governments or individuals. For example, a network data center may host web services for several enterprises and end users. Other exemplary services may include data storage, virtual private networks, traffic engineering, file service, data mining, scientific- or super-computing, and so on. In some embodiments, data center 10 may be individual network servers, network peers, or otherwise.

In this example, data center 10 includes a set of storage systems and application servers 12A-12X (herein, "servers 12") interconnected via high-speed switch fabric 14 provided by one or more tiers of physical network switches and routers. Switch fabric 14 is provided by a set of interconnected top-of-rack (TOR) switches 16A-16BN (collectively, "TOR switches 16") coupled to a distribution layer of chassis switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide servers 12 with redundant (multi-homed) connectivity to IP fabric 20 and service provider network 7. Chassis switches 18 aggregate traffic flows and provides high-speed connectivity between TOR switches 16. TOR switches 16 may be network devices that provide layer two (e.g., MAC) and/or layer 3 (e.g., IP) routing and/or switching functionality. TOR switches 16 and chassis switches 18 may each include one or more processors and a memory, and that are capable of executing one or more software processes. Chassis switches 18 are coupled to IP fabric 20, which performs layer 3 routing to route network traffic between data center 10 and customers 11 by service provider network 7.

SDN controller 22 provides a logically and in some cases physically centralized controller for facilitating operation of one or more virtual networks within data center 10, such as data center 10A, in accordance with one or more embodiments of this disclosure. As described herein, the terms SDN controller and Virtual Networking Controller (VNC) may be used interchangeably. In some examples, SDN controller 22 may operate in response to configuration input received from network administrator 24.

In some examples, SDN controller 22 operates in response to configuration input received from orchestration engine 23, which in turn operates in response to configuration input received from administrator 24. Additional information regarding SDN controller 22 operating in conjunction with other devices of data center 10A or other software-defined network is found in International Application Number PCT/US2013/044378, filed Jun. 5, 2013, and entitled PHYSICAL PATH DETERMINATION FOR VIRTUAL NETWORK PACKET FLOWS, which is incorporated by reference as if fully set forth herein.

In some examples, orchestration engine 23 manages functions of data center 10 such as compute, storage, networking, and application resources. For example, orchestration engine 23 may create a virtual network for a tenant within data center 10 or across data centers. Orchestration engine 23 may attach virtual machines (VMs) to a tenant's virtual network. Orchestration engine 23 may connect a tenant's virtual network to some external network, e.g. the Internet or a VPN. Orchestration engine 23 may implement a security policy across a group of VMs or to the boundary of a tenant's network. Orchestration engine 23 may deploy a network service (e.g. a load balancer) in a tenant's virtual network.

In some examples, SDN controller 22 manages the network and networking services such load balancing, security, and allocate resources from servers 12 to various applications. For example, SDN controller 22 implements high-level requests from orchestration engine 23 by configuring physical switches, e.g. TOR switches 16, chassis switches 18, and switch fabric 14; physical routers; physical service nodes such as firewalls and load balancers; and virtual services such as virtual firewalls in a VM. SDN controller 22 maintains routing, networking, and configuration information within a state database.

Typically, the traffic between any two network devices, such as between network devices within IP fabric 20 (not shown) or between servers 12 and customers 11 or between servers 12, for example, can traverse the physical network using many different paths. A packet flow (or "flow") can be defined by the five values used in a header of a packet, or "five-tuple," i.e., the protocol, Source IP address, Destination IP address, Source port and Destination port that are used to route packets through the physical network. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP)

addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

From time to time, an administrator may desire to perform a software upgrade on one or more network devices 16, 18 that make up switch fabric 14. Conventionally, the administrator may have to manually install the software upgrade to each individual network device 16, 18, which is time consuming and a large administrative burden on data center 10. Further, during this period, the device is transitioned offline and is unable to process customer traffic, causing interruptions to customer applications executing within the cloud data center. Some network devices are ISSU-capable in that they are able to perform such software upgrades without transitioning offline or interrupting customer traffic flow.

Some network devices are In-Service Software Upgrade (ISSU)-capable in that they are able to perform such software upgrades without transitioning offline or interrupting customer traffic flow. Some data centers may include a mixture of ISSU-capable and ISSU-incapable devices. For example, as data center providers expand and upgrade their infrastructure, they commonly implement a "mixed network" that includes newer, ISSU-capable devices as well as legacy, ISSU-incapable devices. However, the use of such a mixed network may prevent an administrator of the data center from deploying an ISSU software upgrade to all of the network devices in the mixed network because such an operation may cause the ISSU-incapable devices, which may make up a substantial portion of switch fabric 14, to transition offline together, causing interruptions to customer traffic flow and applications. Thus, for a mixed network, an administrator may be unable to take advantage of the ISSU capabilities offered by individual ISSU-capable devices and still be forced to manually upgrade each of the network devices 16, 18 in switch fabric 14 to prevent service disruption. Further, manually upgrading each network device 16, 18 is cumbersome and a large administrative burden for data centers with large numbers of devices, as well as prone to error.

In accordance with the techniques of the disclosure, methods, devices, and systems are disclosed for deploying software upgrades to a mixed network of ISSU-capable and ISSU-incapable network devices 16, 18 without interrupting network traffic serviced by the mixed network. In one example, a centralized controller, such as SDN controller 22 or an administrator computing device 24 of cloud data center 10, determines which network devices 16, 18 of cloud data center 10 are ISSU-capable and which network devices 16, 18 are ISSU-incapable. For example, SDN controller 22 sends a message instructing network devices 16, 18 that are ISSU-capable to perform an ISSU operation, e.g. to apply a software update. Further, SDN controller 22 sends a message prompting network devices 16, 18 that are ISSU-incapable to transmit messages to peer network devices 16, 18. The messages indicate that the ISSU-incapable network devices are ISSU-incapable. In some examples, the use of "peer" network devices 16, 18 refers to network devices 16, 18 that neighbor a network device 16, 18, such as those network devices 16, 18 that are BGP peers of the network device 16, 18. In some examples, the peer network devices 16, 18, are neighboring network devices 16, 18 that are ISSU-capable and have completed the ISSU operation. In some examples, the peer network devices 16, 18, are neighboring network devices 16, 18 that are ISSU-incapable but are not currently undergoing a software update. The peer network devices 16, 18 that receive such messages may process the messages to determine that the ISSU-incapable network devices 16, 18 may be unavailable to process or forward network traffic while performing the software upgrade. In response to determining that the ISSU-incapable devices 16, 18 may (or will) be unavailable, the peer network devices 16, 18 redirect traffic to avoid forwarding the traffic to the ISSU-incapable network devices 16, 18 so as to avoid interruption of network traffic across, e.g., switch fabric 14.

The techniques of the disclosure provide for deploying software upgrades to a mixed network of ISSU-capable and ISSU-incapable network devices 16, 18 without interrupting network traffic serviced by the mixed network. While an administrator may still need to upgrade ISSU-incapable network devices 16, 18 manually, the administrator is able to take advantage of the ISSU capabilities of ISSU-capable network devices 16, 18, even in a mixed network of ISSU-capable and ISSU-incapable network devices 16, 18, thereby substantially reducing the burden of deploying software upgrades to a mixed network. Furthermore, the techniques of the disclosure provide a mechanism for ISSU-incapable network devices 16, 18 to notify peer network devices 16, 18 in switch fabric 14 that the ISSU-incapable network devices 16, 18 will go offline for an upgrade, thereby allowing the peer network devices 16, 18 to temporarily route traffic around the ISSU-incapable network devices 16, 18 while the ISSU-incapable network devices are unable to process or forward network traffic (e.g., such as during a software upgrade). Thus, the techniques of the disclosure allow ISSU-incapable network devices 16, 18 to avoid causing interruptions to customer traffic and customer applications serviced by data center 10 while performing software upgrades. In this way, the techniques allow for scalable deployment of software upgrades and reduce the complexity and simplify management of such software upgrades to mixed networks of ISSU-capable and ISSU-incapable network devices 16, 18.

In some examples, an extension of Border Gateway Protocol (BGP) is described for communicating whether a device is ISSU-capable or ISSU-incapable. For example, a network device 16, 18 may indicate its ISSU capability via BGP. Such a BGP message may specify the ISSU capability of network device 16, 18, such as whether network device 16, 18 is "ISSU-CAPABLE" or "ISSU-NOT-CAPABLE," as an extended community for BGP. Additional information with respect to the implementation of BGP extended communities is described in "BGP Extended Communities Attribute," RFC 4360, Internet Engineering Task Force (IETF), February 2006, available at https://tools.ietf.org/rfc/rfc4360, the entire content of which is incorporated herein by reference. A network device 16, 18 may use the BGP message to indicate its ISSU capability to, e.g., peer network devices 16, 18 or to SDN controller 22. Further information with respect to BGP may be found in "A Border Gateway Protocol 4 (BGP-4)," RFC 4271, IETF, January 2006, available at https://tools.ietf.org/html/rfc4271 and "BGP MPLS-Based Ethernet VPN," RFC 7432, IETF, February 2015, available at https://tools.ietf.org/html/rfc7432, the entire contents of each of which is incorporated herein by reference.

Figure 2:
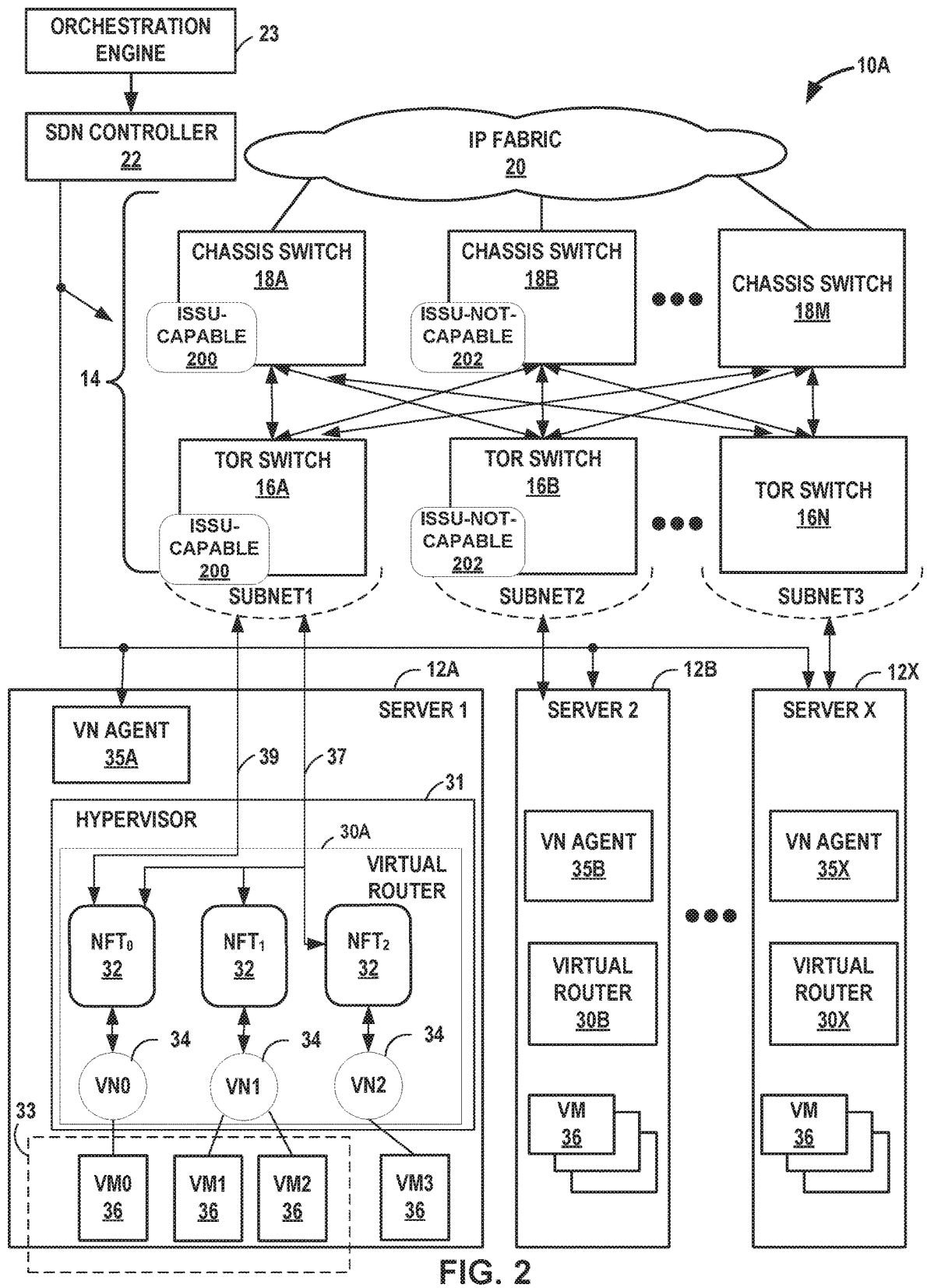
FIG. 2 is a block diagram illustrating an example implementation of the data center of FIG. 1 in further detail.

FIG. 2 is a block diagram illustrating an example implementation of data center 10A of FIG. 1 in further detail. In the example of FIG. 2, data center 10A includes an overlay network that extends switch fabric 14 from physical switches 16, 18 to software or "virtual" switches 30A-30X (collectively, "virtual routers 30"). Virtual routers 30 dynamically create and manage one or more virtual networks 34 usable for communication between application instances. In one example, virtual routers 30 execute the virtual network as an overlay network, which provides the capability to decouple an application's virtual address from a physical address (e.g., IP address) of the one of servers 12A-12X ("servers 12") on which the application is executing. Each virtual network may use its own addressing and security scheme and may be viewed as orthogonal from the physical network and its addressing scheme. Various techniques may be used to transport packets within and across virtual networks 34 over the physical network. In some examples, the techniques described in this disclosure provide multicast service within virtual networks 34 without requiring multicast support in the underlying physical network.

Each virtual router 30 may execute within a hypervisor, a host operating system or other component of each of servers 12. Each of servers 12 may represent an x86 or other general-purpose or special-purpose server capable of executing virtual machines 36. In the example of FIG. 2, virtual router 30A executes within hypervisor 31, also often referred to as a virtual machine manager (VMM), which provides a virtualization platform that allows multiple operating systems to concurrently run on one of servers 12. In the example of FIG. 2, virtual router 30A manages virtual networks 34, each of which provides a network environment for execution of one or more virtual machines (VMs) 36 on top of the virtualization platform provided by hypervisor 31. Each VM 36 is associated with one of the virtual networks VN0-VN1 and may represent tenant VMs running customer applications such as Web servers, database servers, enterprise applications, or hosting virtualized services used to create service chains. In some cases, any one or more of servers 12 or another computing device may host customer applications directly, i.e., not as virtual machines. In some cases, some of VMs 36 may represent containers, another form of virtualized execution environment. That is, both virtual machines and container are examples of virtualized execution environments for executing workloads.

In general, each VM 36 may be any type of software application and may be assigned a virtual address for use within a corresponding virtual network 34, where each of the virtual networks may be a different virtual subnet provided by virtual router 30A. A VM 36 may be assigned its own virtual layer three (L3) IP address, for example, for sending and receiving communications but may be unaware of an IP address of the physical server 12A on which the virtual machine is executing. In this way, a "virtual address" is an address for an application that differs from the logical address for the underlying, physical computer system, e.g., server 12A in the example of FIG. 1 or 2.

In one implementation, each of servers 12 includes a corresponding one of virtual network (VN) agents 35A-35X (collectively, "VN agents 35") that controls the overlay of virtual networks 34 and that coordinates the routing of data packets within server 12. In general, each VN agent 35 communicates with SDN controller 22, which generates commands to control routing of packets through data center 10A. VN agents 35 may operate as a proxy for control plane messages between virtual machines 36 and SDN controller 22. For example, a VM 36 may request to send a message using its virtual address via the VN agent 35A, and VN agent 35A may in turn send the message and request that a response to the message be received for the virtual address of the VM 36 that originated the first message. In some cases, a VM 36 may invoke a procedure or function call presented by an application programming interface of VN agent 35A, and the VN agent 35A may handle encapsulation of the message as well, including addressing.

In some example implementations, each server 12 further includes an orchestration agent (not shown in FIG. 2) that communicates directly with orchestration engine 23. For example, responsive to instructions from orchestration engine 23, the orchestration agent communicates attributes of the particular VMs 30 executing on the respective server 12, and may create or terminate individual VMs.

In one example, network packets, e.g., layer three (L3) IP packets or layer two (L2) Ethernet packets generated or consumed by the instances of applications executed by virtual machines 36 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed within virtual routers 30, e.g., within the hypervisor or the host operating system running on each of servers 12. As another example, encapsulation and de-capsulation functions may be performed at the edge of switch fabric 14 at a first-hop TOR switch 16 that is one hop removed from the application instance that originated the packet. This functionality is referred to herein as tunneling and may be used within data center 10A to create one or more overlay networks. Besides IPinIP, other example tunneling protocols that may be used include IP over GRE, VxLAN, MPLS over GRE, MPLS over UDP, etc.

As noted above, SDN controller 22 provides a logically centralized controller for facilitating operation of one or more virtual networks within data center 10A. SDN controller 22 may, for example, maintain a routing information base, e.g., one or more routing tables that store routing information for the physical network as well as one or more overlay networks of data center 10A. Similarly, switches 16, 18 and virtual routers 30 maintain routing information, such as one or more routing and/or forwarding tables. In one example implementation, virtual router 30A of hypervisor 31 implements a network forwarding table (NFT) 32 for each virtual network 34. In general, each NFT 32 stores forwarding information for the corresponding virtual network 34 and identifies where data packets are to be forwarded and whether the packets are to be encapsulated in a tunneling protocol, such as with a tunnel header that may include one or more headers for different layers of the virtual network protocol stack.

In accordance with the techniques of the disclosure, a software upgrade is deployed to a mixed network of ISSU-capable and ISSU-incapable network devices 16, 18 without interrupting network traffic serviced by the mixed network. In one example, SDN controller 22 of cloud data center 10 determines which network devices 16, 18 of cloud data center 10 are ISSU-capable and which network devices 16, 18 are ISSU-incapable. SDN controller 22 may, for example, request from each network device 16, 18, configuration information for the network device 16, 18. Such configuration information may include, e.g., a device model or a current software version of the network device 16, 18. SDN controller 22 may receive the configuration information and compare the configuration information to a reference table that describes ISSU capabilities for a plurality of different types of network devices 16, 18. In the example of FIG. 2, SDN controller 22 determines that chassis switch 18A and TOR switch 16A are ISSU-capable, while chassis switch 18B and TOR switch 16B are ISSU-incapable. In some examples, SDN controller 22 stores, for each network device 16, 18, an indication of whether the network device 16, 18 is ISSU-capable or ISSU-incapable.

In some examples, SDN controller 22 may include a policy controller (not depicted) which is configured to tag network devices 16, 18 with ISSU-capability "tags." As described herein, a "tag" refers to a data structure that provides information to categorize an object according to a particular value or set of values. In some examples, the tag comprises a key/value pair, wherein the key describes a category of the object, and the value provides a descriptor for the category. As an example, where tag comprises a first key/value pair, the key of the tag is an "ISSU capability," and the value associated with the key is a "ISSU-capable" or "ISSU-NOT-CAPABLE" capability. Furthermore, as used herein, "tagging" an object refers to categorizing the object in a category specified by a tag included in a policy rule. For example, SDN controller 22 may use the policy controller to tag chassis switch 18A and TOR switch 16A with "ISSU-CAPABLE" tags 200 and chassis switch 18B and TOR switch 16B with "ISSU-NOT-CAPABLE" tags 202. The use of such tags may allow SDN controller 22 to distribute, via the policy controller and based on the applied tags, network policies for application to network devices 16, 18. Such policies may include, for example, deployment of ISSU operations to apply software updates. Further explanation with regard to the implementation of a policy controller and the application of tags to infrastructure equipment is provided in U.S. patent application Ser. No. 15/819,522 to Miriyala et al., entitled "SCALABLE POLICY MANAGEMENT FOR VIRTUAL NETWORKS" and filed on Nov. 21, 2017, the entire content of which is incorporated herein by reference.

SDN controller 22 transmits messages to ISSU-capable network devices 16, 18 (e.g., chassis switch 18A and TOR switch 16A) instructing chassis switch 18A and TOR switch 16A to perform an ISSU operation. In some examples, SDN controller 22 may perform a "single trigger" operation in that SDN controller 22 may receive, from a user or administrator, a command to perform an ISSU operation on ISSU-capable network devices 16, 18. In response to the command, SDN controller 22 transmits one or more messages instructing each of the ISSU-capable network devices 16, 18 in switch fabric 14 to initiate the ISSU operation substantially simultaneously with a period of time that each other of the ISSU-capable network devices 16, 18 initiates the ISSU operation.

In some examples, the message instructing the ISSU-capable devices to perform the ISU may include one or more software packages for the ISSU-capable network devices 16, 18 to install. In other examples, the message may specify a location from which the ISSU-capable network devices 16, 18 may retrieve the one or more software packages for the ISSU-capable network devices 16, 18 to install. In some examples, upon successfully completing an ISSU operation, the ISSU-capable network devices 16, 18 notify SDN controller 22 of the completion of the ISSU operation.

If the ISSU operation is not successful, one or more of the ISSU-capable network devices 16, 18 notify SDN controller 22 of the failure of the ISSU operation. In response, SDN controller 22 may, for example, instruct the failed network devices 16, 18 to attempt to retry the ISSU, to abort the ISSU, provide logging information describing the failed ISSU, notify an administrator of the failure, or take some other action. In some examples, SDN controller 22 may re-classify the failed network devices 16, 18 as ISSU-incapable such that a manual upgrade is performed on the failed network devices 16, 18.

Further, SDN controller 22 transmits messages to ISSU-incapable network devices 16, 18 (e.g., chassis switch 18B and TOR switch 16B) prompting ISSU-incapable network devices 16, 18 to transmit messages to peer network devices 16, 18, such as chassis switch 18A and TOR switch 16A. The messages indicate that the ISSU-incapable network devices are ISSU-incapable.

In some examples, each ISSU-incapable network device 16, 18 sends a message to each BGP peer of the ISSU-incapable network device. In some examples, the peer network devices 16, 18, are neighboring network devices 16, 18 that are ISSU-capable and have completed the ISSU operation. In some examples, the peer network devices 16, 18, are neighboring network devices 16, 18 that are ISSU-incapable but are not undergoing a software update at the present time (e.g., have already completed the software update or are scheduled to do so at a later time).

In some examples, the ISSU-incapable network device 16, 18 may transmit such messages via BGP. In some examples, the BGP message specifies the ISSU capability of network device 16, 18, such as whether network device 16, 18 is "ISSU-CAPABLE" or "ISSU-NOT-CAPABLE," as an extended community for BGP. For example, each ISSU-incapable network device 16, 18 may send a BGP message to peer network devices 16, 18 that specifies that the sending network device 16, 18 is ISSU-NOT-CAPABLE as an extended community for BGP.

The peer network devices 16, 18 that receive such messages may process the messages to determine that the ISSU-incapable network devices 16, 18 may be unavailable to process or forward network traffic while performing the software upgrade. In response to determining that the ISSU-incapable devices 16, 18 may (or will) be unavailable, the peer network devices 16, 18 redirect traffic to avoid forwarding the traffic to the ISSU-incapable network devices 16, 18 so as to avoid interruption of network traffic across, e.g., switch fabric 14. In some examples, the peer network device 16, 18 may delete an entry describing the ISSU-incapable network device 16, 18 from a Routing Information Base (RIB) of the peer network device 16, 18 so as to avoid forwarding traffic to the ISSU-incapable network device 16, 18 while the ISSU-incapable network device 16, 18 is unavailable to process or forward traffic because the ISSU-incapable network device 16, 18 is performing the upgrade.

In some examples, after the ISSU-incapable network device 16, 18 has completed the software upgrade, the ISSU-incapable network device 16, 18 may inform peer network devices 16, 18 that the ISSU-incapable network device 16, 18 is online and capable of processing network traffic. This may be done through the use of conventional BGP messages as described in "BGP MPLS-Based Ethernet VPN," RFC 7432, referenced above.

Figure 3:
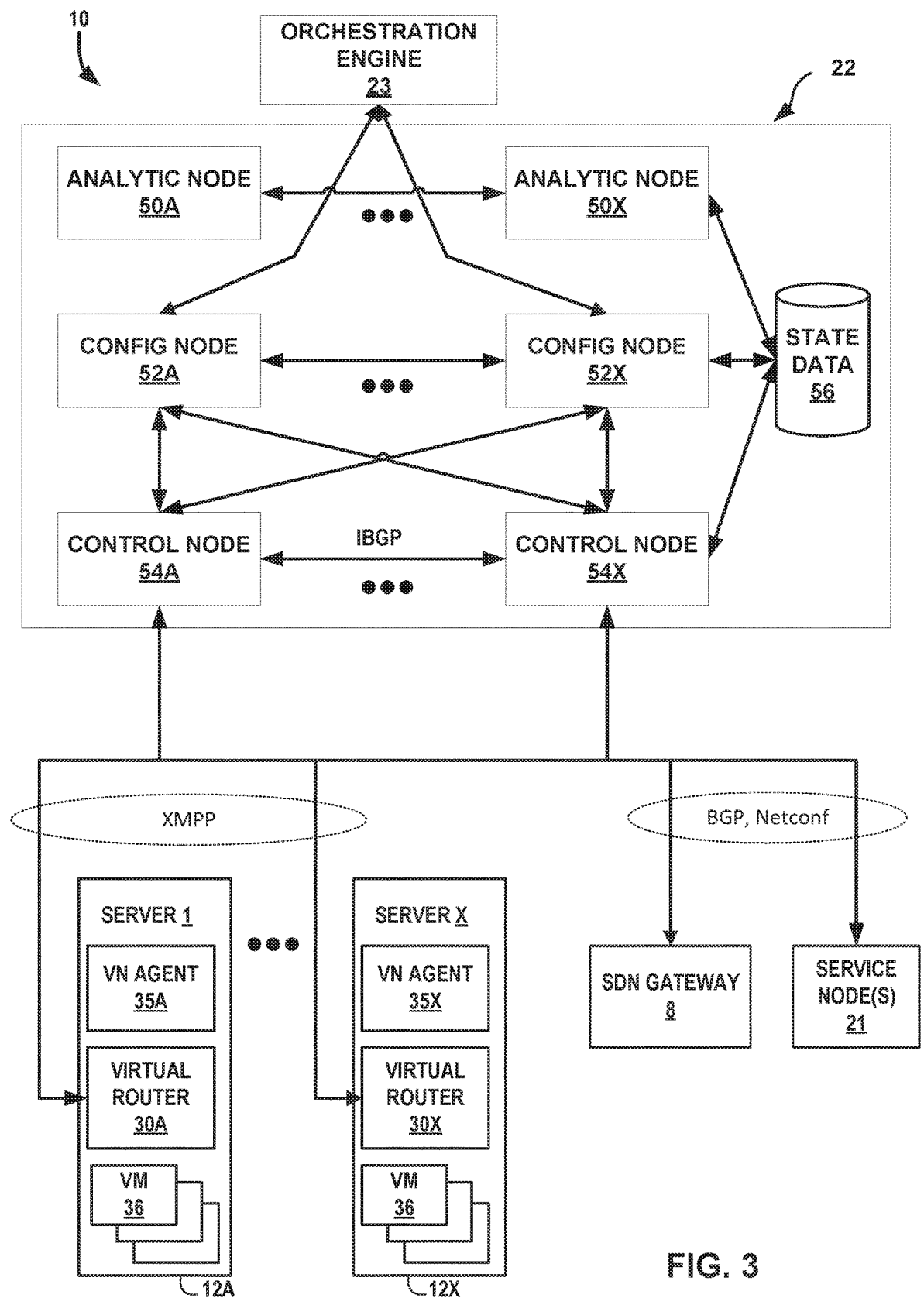
FIG. 3 is a block diagram illustrating an example implementation of the Software-defined Networking (SDN) controller of FIG. 1 in further detail.

FIG. 3 is a block diagram illustrating an example implementation of the Software-defined Networking (SDN) controller of FIG. 1 in further detail. In the example of FIG. 3, SDN controller 22 includes one or more analytic nodes 50A-50X (collectively, "analytic nodes 50"), one or more configuration nodes 52A-52X (collectively, "configuration nodes 52") and control nodes 54A-54X (collectively, "control nodes 54"). In general, each of the nodes 50, 52, and 52 may be implemented as a separate software process, and the nodes may be distributed across multiple hardware computing platforms that provide an environment for execution of the software. Moreover, each of the nodes maintains state data 56, which may be stored within a centralized or distributed database. In some examples, state database 56 is a NoSQL database. In some examples, state database 56 is a database cluster.

In general, analytic nodes 50 are tasked with collecting, storing, correlating, and analyzing information from virtual and physical network elements within data center 10. This information may include statistics, logs, events, and errors for use in managing the routing and network configuration of data center 10. Analytic nodes 50 store this information in state database 56.

Configuration nodes 52 translate the high-level data model of orchestration engine 23 into lower level models suitable for interacting with network elements, such as physical switches 16, 18 and VR agents 35. Configuration nodes 52 keep a persistent copy of the configuration state of SDN controller 22 within state database 56.

Control nodes 54 implement a logically centralized control plane responsible for maintaining ephemeral network state. Control nodes 54 interact with each other and with network elements, such as virtual routers 42 of servers 12, to ensure that the network state is eventually consistent with desired state as specified by orchestration engine 23. In general, control nodes 54 receive configuration state of SDN controller 22 from configuration nodes 32, and exchange routes with each other via IBGP to ensure that all control nodes 54 have the same network state. Further, control nodes 54 exchange routes with VR agents 35 on servers 12 via XMPP. Control nodes 54 communicate the configuration state information, such as routing instances and forwarding policy, to VR agents 35, e.g., via XMPP, for installation within respective virtual routers 30. In some examples, control nodes 54 proxy traffic on behalf of servers 12. These proxy requests may be received over XMPP. Further, control nodes 54 exchange routes with SDN gateway 8 via BGP, and exchange the configuration state of SDN controller 22 with service nodes 21 via Netconf.

Configuration nodes 52 provide a discovery service that customers 4 may use to locate various services available within the network. For example, if VR agent 35A attempts a connection with control node 54A, it uses a discovery service provided by configuration nodes 52 to discover the IP address of control node 54A. Clients executing on VMs 36 may use local configuration, DHCP or DNS to locate the service discovery server within configuration nodes 52.

In some examples, configuration nodes 52 present northbound API that interfaces with orchestration engine 23. Orchestration engine 23 uses this interface to install configuration state using the high-level data model. Configuration nodes 52 further include a message bus to facilitate communications amongst internal components. Configuration nodes 52 further include a transformer that discovers changes in the high-level model of orchestration engine 23 and transforms these changes into corresponding changes in the low level data model managed by SDN controller 22. Configuration nodes 52 further include an IF-MAP server that provides a southbound API to push computed low-level configuration down to control nodes 54. Furthermore, configuration nodes 52 include a distributed applications manager used to allocate unique object identifiers and to implement transactions across data center 10.

In accordance with the techniques of the disclosure, one or more control nodes 54 deploy a software upgrade to network devices 16, 18 of FIG. 1 without interrupting network traffic serviced by network devices 16, 18. In one example, control nodes 54 determine which network devices 16, 18 are ISSU-capable and which network devices 16, 18 are ISSU-incapable. Control nodes 54 may, for example, request from each network device 16, 18, configuration information for the network device 16, 18. Such configuration information may include, e.g., a device model or a current software version of the network device 16, 18. Control nodes 54 may receive the configuration information and compare the configuration information to a reference table, stored within state data 56, that describes ISSU capabilities for a plurality of different types of network devices 16, 18. In some examples, control nodes 54 stores, for each network device 16, 18, an indication of whether the network device 16, 18 is ISSU-capable or ISSU-incapable in state data 56.

In some examples, control nodes 54 implement a policy controller (not depicted) which is configured to tag network devices 16, 18 with ISSU-capability "tags." As an example, where tag comprises a first key/value pair, the key of the tag is an "ISSU capability," and the value associated with the key is a "ISSU-capable" or "ISSU-NOT-CAPABLE" capability. The use of such tags may allow control nodes 54 to distribute, via the policy controller and based on the applied tags, network policies for application to network devices 16, 18. Such policies may include, for example, deployment of ISSU operations to apply software updates.

Control nodes 54 transmit messages to ISSU-capable network devices 16, 18 (e.g., chassis switch 18A and TOR switch 16A of FIG. 1) instructing chassis switch 18A and TOR switch 16A to perform an ISSU operation. In some examples, control nodes 54 may perform a "single trigger" operation in that controller nodes 54 may receive, from a user or administrator, a command to perform an ISSU operation on ISSU-capable network devices 16, 18. In response to the command, control nodes 54 transmit one or more messages instructing each of the ISSU-capable network devices 16, 18 in switch fabric 14 of FIG. 1 to initiate the ISSU operation substantially simultaneously with a period of time that each other of the ISSU-capable network devices 16, 18 initiates the ISSU operation.

In some examples, the message instructing the ISSU-capable devices to perform the ISU may include one or more software packages for the ISSU-capable network devices 16, 18 to install. In other examples, the message may specify a location from which the ISSU-capable network devices 16, 18 may retrieve the one or more software packages for the ISSU-capable network devices 16, 18 to install. In some examples, upon successfully completing an ISSU operation, the ISSU-capable network devices 16, 18 notify one or more of control nodes 54 of the completion of the ISSU operation.

Further, control nodes 54 transmit messages to ISSU-incapable network devices 16, 18 (e.g., chassis switch 18B and TOR switch 16B of FIG. 1) prompting ISSU-incapable network devices 16, 18 to transmit messages to peer network devices 16, 18, such as chassis switch 18A and TOR switch 16A. The messages indicate that the ISSU-incapable network devices 16, 18 are ISSU-incapable. In some examples, each ISSU-incapable network device 16, 18 sends a message to each BGP peer of the ISSU-incapable network device. In some examples, the peer network devices 16, 18, are neighboring network devices 16, 18 that are ISSU-capable and have completed the ISSU operation. In some examples, the peer network devices 16, 18, are neighboring network devices 16, 18 that are ISSU-incapable but are not undergoing a software update at the present time (e.g., have already completed the software update or are scheduled to do so at a later time). The peer network devices 16, 18 that receive such messages may process the messages to determine that the ISSU-incapable network devices 16, 18 may be unavailable to process or forward network traffic while performing the software upgrade. In response to determining that the ISSU-incapable devices 16, 18 may (or will) be unavailable, the peer network devices 16, 18 redirect traffic to avoid forwarding the traffic to the ISSU-incapable network devices 16, 18 so as to avoid interruption of network traffic across, e.g., switch fabric 14. Thus, by prompting the ISSU-incapable network devices 16, 18 to send such messages indicating that the ISSU-incapable network devices 16, 18 are ISSU-incapable, controller nodes 54 may orchestrate a software upgrade across switch fabric 14 without interrupting network traffic serviced by network devices 16, 18.

Figure 4:
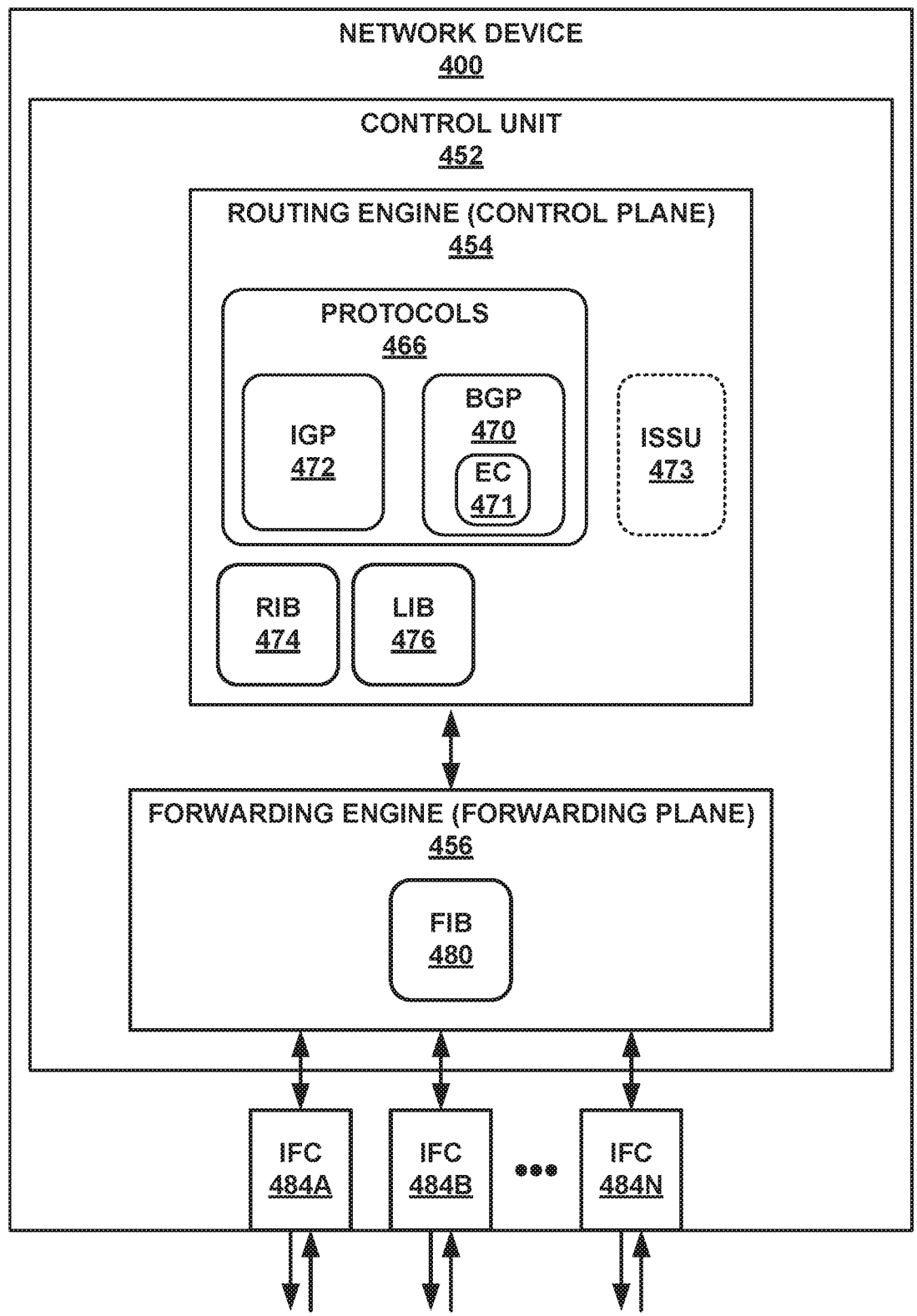
FIG. 4 is a block diagram illustrating an example of a router in which examples of the techniques described herein may be implemented.

FIG. 4 is a block diagram illustrating an example of a router in which examples of the techniques described herein may be implemented. Network device 400 may operate as any physical device of switch fabric 14, such as one of chassis switches 18 or TOR switches 16 of FIG. 1. Further, network device 400 maybe an example of another type of network device, such as a gateway, switch, or router, that is not expressly depicted in FIG. 1.

In the illustrated example of FIG. 4, network device 400 includes a control unit 452 with a routing engine 454 that provides control plane functionality for the network device and a forwarding engine 456 that provides forwarding or data plane functionality for the network device to send and receive traffic by a set of interface cards 484A-484N ("IFCs 484") that typically have one or more physical network interface ports. Control unit 452 may include one or more daemons (not shown) that comprise user-level processes that run network management software, execute routing protocols to communicate with peer routers or switches, maintain and update one or more routing tables in routing engine 454, and create one or more forwarding tables for installation in forwarding engine 456, among other functions.

Forwarding engine 456 performs packet switching and forwarding of incoming data packets for transmission over a network. As shown in FIG. 3, forwarding engine 456 includes a forwarding information base (FIB) 480 that stores forwarding data structures associating network destinations with next hops and outgoing interfaces. Although not shown in FIG. 3, forwarding engine 456 may comprise a central processing unit (CPU), memory and one or more programmable packet-forwarding application-specific integrated circuits (ASICs).

Routing engine 454 includes various protocols 466 that perform routing functions for network device 400. In the illustrated example of FIG. 3, routing engine 454 includes BGP 470 and IGP 472 as routing protocols used to exchange routing information with other routing devices in a network in order to discover the network topology and update a routing information base (RIB) 474. In the examples described in this disclosure, IGP 472 may be a link-state routing protocol such as open shortest path first (OSPF) or intermediate system-intermedia system (IS-IS).

In examples where network device 400 is ISSU-capable, routing engine 454 may include ISSU 473 to provide network device 400 with ISSU capabilities for performing software upgrades without interrupting the traffic processing and forwarding capabilities of network device 400. In examples where network device 400 is ISSU-incapable, routing engine 454 may not include ISSU 473. In some examples, one or more functions of network device 400 may be virtualized, such as where network device 400 is a virtual router. Additional information on how a virtual router may perform an ISSU is described in U.S. patent application Ser. No. 15/639,556 to Venkata et al., entitled "IN-SERVICE SOFTWARE UPGRADE OF VIRTUAL ROUTER WITH REDUCED PACKET LOSS" and filed on Jun. 30, 2017, the entire content of which is incorporated herein by reference.

RIB 474 may describe the topology of the network in which network device 400 resides, and may also describe various routes within the network and the appropriate next hops for each route, i.e., the neighboring routing devices along each of the routes. Routing engine 454 analyzes the information stored in RIB 474 to generate forwarding information. Routing engine 454 then installs forwarding data structures into FIB 480 within forwarding engine 456. FIB 480 associates network destinations with specific next hops and corresponding interface ports within the forwarding plane. LIB 476 maintains mappings of next hop labels to the next hops for each route within the network from RIB 474.

According to the techniques of the disclosure, in examples where network device 400 is ISSU-incapable, network device 400 may be unable to process and forward network traffic while performing a software upgrade. For example, while performing a software upgrade, network device 400 may need to temporarily transition offline or temporarily suspend, deactivate, restart, reboot, or otherwise disable certain functionality, such as software modules, or hardware features. Therefore, in response to determining that network device 400 will perform a software upgrade, network device 400 may transmit messages to peer network devices 16, 18 indicating that network device 400 is ISSU-incapable. In some examples, network device 400 may transmit such messages via BGP 470. In some examples, the BGP message specifies the ISSU capability of network device 400, such as whether network device 400 is "ISSU-CAPABLE" or "ISSU-NOT-CAPABLE," as extended community 471 for BGP 470. For example, network device 400 may transmit a BGP message to a neighboring network device 16, 18 that specifies that network device 400 is ISSU-NOT-CAPABLE as extended community 471 for BGP 470. In some examples, network device 400 may transmit such a message in response to a message from a centralized controller, such as SDN controller 22 or an administrator locally accessing network device 400. In some examples, after network device 400 has completed the software upgrade, network device 400 may inform peer network devices 16, 18 that network device 400 is online and capable of processing network traffic. This may be done through the use of conventional BGP messages as described in "BGP MPLS-Based Ethernet VPN," RFC 7432, referenced above.

Furthermore, network device 400 may receive a message as described above that indicates that another network device 16, 18 is ISSU-incapable. In response to receiving the message indicating that the other network device 16, 18 is ISSU-incapable, network device 400 is configured to redirect traffic to avoid forwarding the traffic to the other network device 16, 18 so as to avoid interruption of network traffic serviced by data center 10. In some examples, network device 400 may delete an entry describing the other ISSU-incapable network device 16, 18 from RIB 474 so as to avoid forwarding traffic to the other ISSU-incapable network device 16, 18 while the other ISSU-incapable network device 16, 18 is performing the upgrade, and thus unable to process or forward network traffic. In some examples, network device 400 calculates a new route to reach a destination of the network traffic. The new route may include, e.g., another one of network devices 16, 18 as a next hop for the network traffic as an alternate route so as to bypass the other ISSU-incapable network device 16, 18. Network device 400 stores the new route in RIB 474 and forwarding structure in FIB 480. Network device 400 may be configured to process such a message indicating that the other network device 16, 18 is ISSU-incapable regardless of whether network device 400 itself is ISSU-capable or ISSU-incapable.

Figure 5:
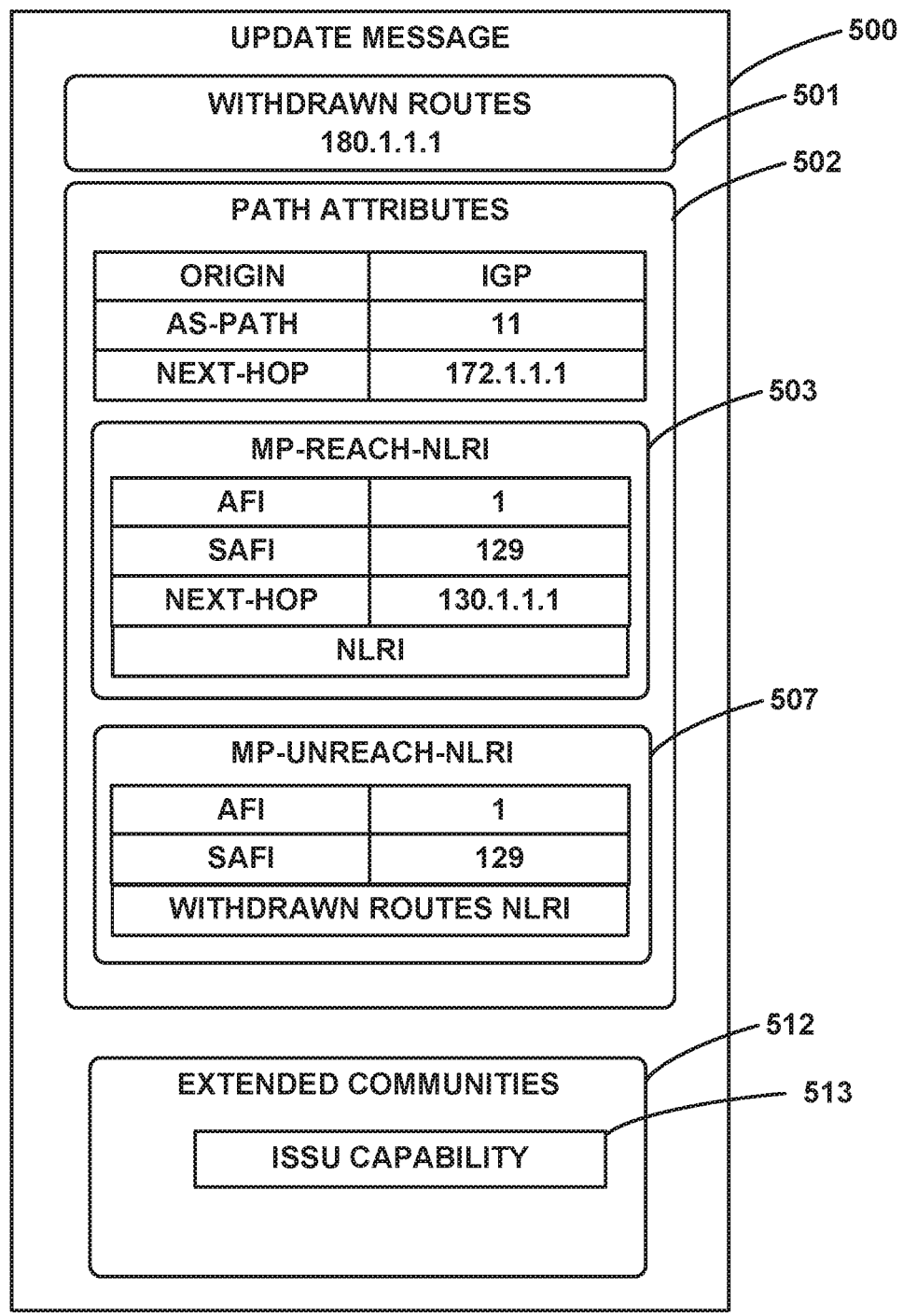
FIG. 5 is a block diagram illustrating an example message that includes ISSU capability information in accordance with techniques described herein.

FIG. 5 is a block diagram illustrating an example message that includes ISSU capability information in accordance with techniques described herein. Extended BGP UPDATE message 500 conforms to Multiprotocol Extensions for BGP-4 (MP-BGP). Additional information with respect to MP-BGP is provided by Multiprotocol Extensions for BGP-4, RFC 4760, IETF January 2007, available at https://tools.ietf.org/html/rfc4760, the entire content of which is incorporated herein by reference.

BGP UPDATE messages, such as example message 500, may be used to transfer routing information between BGP peers such as between network devices 16, 18. The information in UPDATE message 500 may be used by one of network devices 16, 18 to construct a graph that describes the relationships of various peer devices to the one of network devices 16, 18. By applying rules set forth in such a BGP UPDATE message, a network device 16, 18 may detect routing information loops and other anomalies remove such problems from inter-AS routing.

One of network devices 16, 18 may use BGP UPDATE messages, such as example message 500, to advertise feasible routes that share common path attributes to a peer network device 16, 18, or to withdraw multiple unfeasible routes from service. A BGP UPDATE message may simultaneously advertise a feasible route and withdraw multiple unfeasible routes from service. A BGP UPDATE message includes a fixed-size BGP header, and may includes other fields (e.g., such as the extended community described herein). Some fields may not be present in every BGP UPDATE message.

Example BGP UPDATE message 500 includes withdrawn routes 501. For purposes of illustration, extended BGP UPDATE message 500 is illustrated using glyphs, rather than with packet fields. Withdrawn routes 501 may include a preceding integer that indicates a total length of the withdrawn routes. A value of 0 indicates that no routes are being withdrawn from service, and that no withdrawn routes are present in the UPDATE message. Withdrawn routes 501 may further include a list of IP address prefixes for the routes that are being withdrawn from service.

Example BGP UPDATE message 500 further includes Path Attributes 502. Path Attributes 502 is a variable-length sequence that specifies path attributes for UPDATE message 500. Path Attributes 502 is typically present in BGP UPDATE messages, except where a BGP UPDATE message specifies only withdrawn routes. Path Attributes 502 further specifies one or more attribute flags. The attribute flags specify, e.g., whether the attribute is optional or well known, whether an optional attribute is transitive or non-transitive, whether the information contained in the optional transitive attribute is partial or complete, an attribute length, and an attribute type.

The attribute type specified by Path Attributes 502 may include, e.g., an Origin, an AS-Path, and a Next-Hop. The Origin attribute type is a well-known mandatory attribute that defines the origin of the path information. For example, the Origin may specify one of Interior Gateway Protocol (IGP) (e.g., Network Layer Reachability Information (NLRI) is interior to the originating AS, Exterior Gateway Protocol (EGP) (e.g., NLRI is learned via the EGP protocol), or Incomplete (e.g., NLRI is learned by some other means).

The AS-Path attribute type is a well-known mandatory attribute that is composed of a sequence of AS path segments. The AS-Path may specify an unordered set of ASes a route in UPDATE message 500 has traversed, or an ordered set of ASes a route in the UPDATE message 500 has traversed.

The Next Hop attribute type is a well-known mandatory attribute that defines an IP address (e.g., in unicast) of the network device that should be used as a next hop to a destinations listed in MP-REACH-NLRI field 503 of UPDATE message 500.

Each of NLRI fields 503 and 507 contain a list of IP address prefixes. For example, MP-REACH-NLRI 503 carries a set of reachable destinations together with the next hop information to be used for forwarding to these destinations. MP-UNREACH-NLRI 507 carries a set of unreachable destinations. Both of these attributes are optional and non-transitive. This way, a BGP speaker, such as one of network devices 16, 18, that does not support multiprotocol BGP capabilities may ignore the information carried in these attributes and will not pass it to other BGP speakers.

MP-REACH-NLRI 503 specifies, e.g., an Address Family Identifier (AFI), a Subsequent Address Family Identifier (SAFI), a next hop, and NLRI. The AFI field, in combination with the SAFI field, identifies a set of Network Layer protocols to which the address carried in the Next Hop field belongs, the way in which the address of the next hop is encoded, and the semantics of the NLRI. If the Next Hop is allowed to be from more than one Network Layer protocol, the encoding of the Next Hop provides a way to determine the Network Layer protocol used. The NLRI field lists NLRI for the feasible routes advertised in MP-REACH-NLRI 503.

MP-UNREACH-NLRI 507 specifies, e.g., an AFI, an SAFI, and NLRI for one or more withdrawn routes. The AFI and SAFI of MP-UNREACH-NLRI 507 are similar to the AFI and SAFI of MP-REACH-NLRI 503. Withdrawn Routes NLRI lists NLRI for one or more routes that are being withdrawn from service. In some examples, message 500 contains MP_UNREACH_NLRI 507 and is not required to carry any other path attributes.

UPDATE message 500 advertises one set of path attributes 502 but may advertise multiple destinations, provided that the destinations share path attributes 502. Path Attributes 502 contained in a given UPDATE message 500 applies to all destinations specified by NLRI fields 503 and 507 of UPDATE message 500.

UPDATE message 500 may list multiple routes that are to be withdrawn from service. Each such route is identified by its destination (expressed as an IP prefix), which unambiguously identifies the route in the context of the BGP speaker—BGP speaker connection to which it has been previously advertised.

UPDATE message 500 may advertise only routes that are to be withdrawn from service, in which case message 500 does not include path attributes 502 or NLRI. Conversely, UPDATE message 500 may advertise only a feasible route, in which case Withdrawn Routes field 501 need not be present.

UPDATE message 500 typically does not include the same address prefix in Withdrawn Routes field 501 as in NLRI fields 503 or 507. However, a BGP speaker may support processing UPDATE message 500 in this form. A BGP speaker typically treats an UPDATE message 500 of this form as though Withdrawn Routes field 501 does not contain the address prefix.

Extended communities attribute 512 includes ISSU Capability field 513 that defines an ISSU capability of a network device. For example, network device 16, 18 may send message 500 that includes ISSU Capability field 513 to indicate the device's ability to perform an ISSU. ISSU field 513 may specify, e.g., "ISSU-CAPABLE" to indicate that a network device 16, 18 is ISSU-capable, or "ISSU-NOT-CAPABLE" to indicate that a network device 16, 18 is ISSU-incapable. In this way, a network devices 16, 18 that receives a BGP UPDATE message 500 indicating that a peer network device is ISSU-incapable may determine that the peer network device may be unable to process or forward network traffic while performing a software upgrade. The network devices 16, 18 may further route network traffic around the peer network device so as to allow switch fabric 14 to continue to operate to transport customer traffic while the peer network device is performing the software update.

FIG. 6 is a flowchart illustrating an example operation in accordance with the techniques of the disclosure. For convenience, FIG. 6 is described with respect to FIGS. 1, 2, and 3. In the example of FIG. 6, first network device 400A and second network device 400B are examples of network device 400 of FIG. 3. Further, first network device 400A and second network device 400B are BGP peers of one another.

In the example of FIG. 6, a software upgrade is deployed to a mixed network of network devices 16, 18 that include ISSU-capable network device 400A and ISSU-incapable network device 400B without interrupting network traffic serviced by the mixed network. In one example, SDN controller 22 of cloud data center 10 determines which network devices 16, 18 of cloud data center 10 are ISSU-capable and which network devices 16, 18 are ISSU-incapable. In the example of FIG. 6, SDN controller 22 determines that first network device 400A is ISSU-capable and second network device 400B is ISSU-incapable (600). SDN controller 22 may, for example, request from network devices 400A and 400B configuration information for the network device. Such configuration information may include, e.g., a device model or a current software version of the network device. SDN controller 22 may receive the configuration information and compare the configuration information to a reference table that describes ISSU capabilities for a plurality of different types of network devices. In some examples, SDN controller 22 stores, for each of network devices 400A and 400B, an indication of whether the network device is ISSU-capable or ISSU-incapable.

SDN controller 22 transmits a message instructing network device 400A to perform an ISSU operation (602). In some examples, the instructions may include one or more software packages for network device 400A to install. In other examples, the instructions may specify a location from which network device 400A may retrieve the one or more software packages for network device 400A to install. In response to receiving the instructions, network device 400A performs the ISSU operation (604). In some examples, upon successfully completing the ISSU operation, network device 400A transmits a message to SDN controller 22 to notify SDN controller 22 of the completion of the ISSU operation.

Further, SDN controller 22 transmits instructions to network device 400B instructing network device 400B to transmit a message indicating that network device 400B is ISSU-incapable (606). While in the example operation of FIG. 6, SDN controller 22 transmits the instructions that network device 400B will go offline, in other examples, network device 400B may receive such instructions directly from an administrator accessing network device 400B locally. In some examples, SDN controller 22 does not transmit the instructions to network device 400B until after determining that network device 400A has completed the ISSU. SDN controller may wait until, e.g., receiving a message indicating successful completion of the ISSU from all of the ISSU-capable device 16, 18 and including network device 400A, or receiving messages indicating successful completion of the ISSU from a substantial number of ISSU-capable device 16, 18 (e.g., 95%, 90%, 75%, 50%, etc.).

In response to receiving the instructions from SDN controller 22, network device 400B transmits a message to peer network devices, such as network device 400A, that network device 400B is ISSU-incapable (608). In some examples, network device 400B may transmit such a message as a BGP message including a BGP extended community specifying that network device 400B is "ISSU-NOT-CAPABLE" as described above.

In response to receiving such a message indicating that network device 400B is ISSU-incapable, network device 400A determines that network device 400B may subsequently be unable to process or forward traffic while performing a software upgrade (610). Further, network device 400A redirects traffic to avoid forwarding the traffic to network device 400B so as to avoid interruption of network traffic serviced by data center 10 while network device 400B is performing the software upgrade (612). In some examples, network device 400A deletes an entry describing network device 400B from a RIB of network device 400A so as to avoid forwarding traffic to network device 400B while network device 400B performing the upgrade. Network device 400A may further calculate a new route to reach a destination of the network traffic. The new route may include, e.g., another one of network devices 16, 18 as a next hop for the network traffic as an alternate route so as to bypass network device 400B. Network device 400A may stores the new route and forwarding structure a FIB and RIB of network device 400A.

In some examples, after network device 400B has completed the software upgrade, network device 400B may inform neighboring network devices, such as network device 400A, that network device 400B is online and capable of processing network traffic. This may be done through the use of conventional BGP messages as described in "BGP MPLS-Based Ethernet VPN," RFC 7432, referenced above.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
   determining, by a centralized controller of a network that is in communication with a plurality of network devices for the network, that first network devices of the plurality of network devices are In-Service Software Upgrade (ISSU)-capable and second network devices of the plurality of network devices are not ISSU-capable, wherein the first network devices that are ISSU-capable are configured to at least one of process or forward network traffic while performing a software upgrade, wherein the second network devices that are not ISSU-capable are unable to process or forward network traffic while performing the software upgrade, and wherein the centralized controller is executed by a computing device separate from the first network devices and the second network devices;
   transmitting, by the centralized controller and over the network, one or more messages instructing the first network devices to perform an ISSU operation during which the first network devices are configured to at least one of process or forward network traffic while performing the software upgrade; and
   transmitting, by the centralized controller and over the network, one or more messages instructing each network device of the second network devices to transmit one or more Border Gateway Protocol (BGP) extended community messages to peer network devices, the one or more BGP extended community messages indicating that the network device of the second network devices is not ISSU-capable to enable the second network devices to transition offline for the software upgrade without interrupting network traffic within the network.

2. The method of claim 1, wherein determining that the first network devices are ISSU-capable and the second network devices are not ISSU-capable comprises:
   requesting, by the centralized controller and from each network device of the plurality of network devices, configuration information for the network device; and
   determining, by the centralized controller and for each network device, whether the configuration information for the network device indicates that the network device is ISSU-capable or not ISSU-capable.

3. The method of claim 2, wherein the configuration information includes at least one of a device model or a software version.

4. The method of claim 1, wherein determining that the first network devices are ISSU-capable and the second network devices are not ISSU-capable comprises:
   determining, by the centralized controller and for each network device, whether one or more tags applied to the network device indicate that the network device is ISSU-capable or not ISSU-capable.

5. The method of claim 1, wherein transmitting the one or more messages instructing the first network devices to perform the ISSU operation comprises
   receiving, by the centralized controller and from a user, a command to perform the ISSU operation on the first network devices; and
   transmitting, by the centralized controller and in response to the command, the one or more messages instructing the first network devices to perform the ISSU operation, wherein the one or more messages further instruct each of the first network devices to initiate the ISSU operation during a period of time that each other of the first network devices initiates the ISSU operation.

6. The method of claim 1, further comprising storing, by the centralized controller and for each network device of the plurality of network devices, an indication of whether the network device is ISSU-capable or not ISSU-capable.

7. The method of claim 1, wherein the centralized controller is a Software-Defined Networking (SDN) controller.

8. The method of claim 1, wherein the one or more messages instructing the first network devices to perform the ISSU operation include a software package for the first network devices to install.

9. The method of claim 1, wherein the one or more messages instructing the first network devices to perform the ISSU operation specify a location of a software package for the first network devices to install.

10. A computing device comprising processing circuitry configured to execute a centralized controller of a network that is in communication with a plurality of network devices for the network, the centralized controller configured to:
   determine that first network devices of the plurality of network devices are In-Service Software Upgrade (ISSU)-capable and second network devices of the plurality of network devices are not ISSU-capable, wherein the first network devices that are ISSU-capable are configured to at least one of process or forward network traffic while performing a software upgrade, wherein the second network devices that are not ISSU-capable are unable to process or forward network traffic while performing the software upgrade, and wherein the computing device is separate from the first network devices and the second network devices;
   transmit, over the network, one or more messages instructing the first network devices to perform an ISSU operation during which the first network devices are configured to at least one of process or forward network traffic while performing the software upgrade; and
   transmit, over the network, one or more messages instructing each network device of the second network devices to transmit a Border Gateway Protocol (BGP) extended community message to peer network devices of the network device, the BGP extended community message indicating that the network device is not ISSU-capable to enable the network device of the second network devices to transition offline for the software upgrade without interrupting network traffic within the network.

11. The centralized controller of claim 10, wherein, to determine that the first network devices are ISSU-capable and the second network devices are not ISSU-capable, the centralized controller is configured to:
   request, from each network device of the plurality of network devices, configuration information for the network device; and
   determine, for each network device, whether the configuration information for the network device indicates that the network device is ISSU-capable or not ISSU-capable.

12. The centralized controller of claim 10, wherein, to determine that the first network devices are ISSU-capable and the second network devices are not ISSU-capable, the centralized controller is configured to:
   determine, for each network device, whether one or more tags applied to the network device indicate that the network device is ISSU-capable or not ISSU-capable.

13. The centralized controller of claim 10, wherein, to transmit one or more messages instructing the first network devices to perform the ISSU operation, the centralized controller is further configured to:
   receive, from a user, a command to perform the ISSU operation on the first network devices; and
   transmit, in response to the command, the one or more messages instructing the first network devices to perform an ISSU operation, wherein the one or more messages further instruct each of the first network devices to initiate the ISSU operation during a period of time that each other of the first network devices initiates the ISSU operation.

14. The centralized controller of claim 10, wherein the centralized controller is further configured to store, for each network device of the plurality of network devices, an indication of whether the network device is ISSU-capable or not ISSU-capable.

15. A first network device of a plurality of network devices of a network, the first network device comprising processing circuitry and configured to:
   receive, from a second network device of the plurality of network devices that is unable to process or forward network traffic while performing a software upgrade, a Border Gateway Protocol (BGP) extended community message indicating that the second network device is not In-Service Software Upgrade (ISSU)-capable, wherein the second network device is a peer of the first network device; and
   in response to receiving the message indicating that the second network device is not ISSU-capable, redirect the network traffic to avoid forwarding the network traffic to the second network device to enable the second network device to transition offline for the software upgrade without interrupting the network traffic within the network.

16. The first network device of claim 15,
   wherein the first network device is further configured to process the BGP extended community message indicating that the second network device is not ISSU-capable to determine that the second network device will be unavailable to process the network traffic during a software upgrade, and
   wherein to redirect the network traffic in response to receiving the BGP extended community message, the first network device is further configured to direct the network traffic to avoid the second network device in response to determining that the second network device will be unavailable to process the network traffic during the software upgrade.

17. The first network device of claim 15, wherein, to redirect the network traffic to avoid forwarding the network traffic to the second network device, the first network device is configured to:
   remove, from a Routing Information Base of the first network device, an entry describing the second network device.

18. The first network device of claim 15, wherein, to redirect the network traffic to avoid forwarding the network traffic to the second network device, the first network device is configured to:
   calculate a new route to reach a destination of the traffic, wherein the new route includes a third network device as a next hop; and
   store the new route in a Forwarding Information Base (FIB) of the first network device.

19. The first network device of claim 15,
   wherein the first network device is ISSU-capable, and
   wherein the first network device is further configured to perform an ISSU operation in response to receiving a message from a centralized controller for the network to perform the ISSU operation.

* * * * *